United States Patent
Warren et al.

(10) Patent No.: US 11,186,454 B2
(45) Date of Patent: Nov. 30, 2021

(54) DUST CONTROL SYSTEMS FOR DISCHARGE OF BULK MATERIAL

(71) Applicant: Halliburton Energy Services, Inc., Houston, TX (US)

(72) Inventors: Wesley John Warren, Marlow, OK (US); Austin Carl Schaffner, Duncan, OK (US); Bryan Chapman Lucas, Duncan, OK (US); Chad Adam Fisher, Cache, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/319,589

(22) PCT Filed: Aug. 24, 2016

(86) PCT No.: PCT/US2016/048420
§ 371 (c)(1),
(2) Date: Jan. 22, 2019

(87) PCT Pub. No.: WO2018/038723
PCT Pub. Date: Mar. 1, 2018

(65) Prior Publication Data
US 2020/0048020 A1  Feb. 13, 2020

(51) Int. Cl.
*B65G 69/18* (2006.01)
*B65D 88/30* (2006.01)
(Continued)

(52) U.S. Cl.
CPC ............. *B65G 69/18* (2013.01); *B65D 88/26* (2013.01); *B65D 88/30* (2013.01); *B01F 15/00961* (2013.01); *B01F 15/0235* (2013.01)

(58) Field of Classification Search
CPC .... B65G 21/08; B65G 69/186; B65G 69/182; B65G 69/18; B65G 65/40; E21B 41/00;
(Continued)

(56) References Cited

U.S. PATENT DOCUMENTS

| 710,611 A | 10/1902 | Ray |
| 917,646 A | 4/1909 | Otto |

(Continued)

FOREIGN PATENT DOCUMENTS

| EP | 2937826 A1 | 10/2015 |
| GB | 2066220 A | 7/1981 |

(Continued)

OTHER PUBLICATIONS

International Search Report and Written Opinion issued in related PCT Application No. PCT/US2016/048420 dated May 22, 2017, 12 pages.

(Continued)

*Primary Examiner* — James R Bidwell
(74) *Attorney, Agent, or Firm* — John Wustenberg; Baker Botts L.L.P.

(57) ABSTRACT

Controlling the dust emissions from the discharge of bulk materials from a container provides many benefits. A support structure may include a plurality of outlets or chutes for discharging the bulk material. A dust control damper coupled to the outlets not currently in use for the discharge of bulk material may prevent dust from escaping into the surrounding air. The dust control dampers may automatically transition between a closed position and an open position. A flexibly collapsible shroud may also be coupled to a discharge gate of a container. The shroud may expand to seal against the outlet when bulk material is discharge. A vacuum system at or near an outlet may reclaim any dust that escapes during discharge of the bulk material.

20 Claims, 6 Drawing Sheets

(51) Int. Cl.
 *B65D 88/26* (2006.01)
 *B01F 15/00* (2006.01)
 *B01F 15/02* (2006.01)

(58) Field of Classification Search
 CPC .... E21B 43/267; B01F 15/00961; B08B 5/04;
  B08B 15/007; B08B 15/02; B65D 88/00;
  B65D 88/30; B65D 88/02; B65D 88/26;
  B65D 90/58; B65D 19/00; B65D 90/14;
  E02F 3/96; E04G 21/025
 See application file for complete search history.

(56) References Cited

U.S. PATENT DOCUMENTS

| | | | |
|---|---|---|---|
| 1,519,153 A | 9/1923 | Mitton | |
| 1,726,603 A | 9/1929 | Wallace | |
| 1,795,987 A | 3/1931 | Adams | |
| 2,203,959 A * | 6/1940 | Hammack | B07B 4/025 |
| | | | 209/137 |
| 2,231,911 A | 2/1941 | Hitt et al. | |
| 2,281,497 A | 4/1942 | Hyson et al. | |
| 2,385,245 A | 9/1945 | Willoughby | |
| 2,415,782 A | 2/1947 | Zademach | |
| 2,513,012 A | 6/1950 | Dugas | |
| 2,563,470 A | 8/1951 | Kane | |
| 2,652,174 A | 9/1953 | Shea | |
| 2,670,866 A | 3/1954 | Glesby | |
| 2,678,737 A | 5/1954 | Mangrum | |
| 2,759,737 A | 8/1956 | Manning | |
| 2,802,603 A | 8/1957 | McCray | |
| 2,867,336 A | 1/1959 | Soldini et al. | |
| 2,869,900 A * | 1/1959 | Heteji | B01F 9/06 |
| | | | 285/9.2 |
| 3,049,248 A | 8/1962 | Heltzel et al. | |
| 3,083,879 A | 4/1963 | Coleman | |
| 3,151,779 A | 10/1964 | Rensch et al. | |
| 3,203,370 A | 8/1965 | Friedrich et al. | |
| 3,217,927 A | 11/1965 | Bale, Jr. et al. | |
| 3,318,473 A | 5/1967 | Jones et al. | |
| 3,326,572 A | 6/1967 | Murray | |
| 3,343,688 A | 9/1967 | Ross | |
| 3,354,918 A | 11/1967 | Coleman | |
| 3,378,124 A * | 4/1968 | Johannes | B03B 11/00 |
| | | | 193/2 R |
| 3,380,333 A | 4/1968 | Clay et al. | |
| 3,404,963 A | 10/1968 | Fritsche et al. | |
| 3,410,530 A | 11/1968 | Gilman | |
| 3,432,151 A | 3/1969 | O'Loughlin et al. | |
| 3,467,408 A | 9/1969 | Regalia | |
| 3,476,270 A | 11/1969 | Cox et al. | |
| 3,602,400 A | 8/1971 | Cooke | |
| 3,627,555 A | 12/1971 | Driscoll | |
| 3,698,693 A | 10/1972 | Poncet | |
| 3,785,534 A | 1/1974 | Smith | |
| 3,802,584 A | 4/1974 | Sackett, Sr. et al. | |
| 3,986,708 A | 10/1976 | Heltzel et al. | |
| 4,023,719 A | 5/1977 | Noyon | |
| 4,058,239 A | 11/1977 | Mill | |
| 4,125,195 A * | 11/1978 | Sasadi | B65G 11/126 |
| | | | 141/284 |
| 4,138,163 A | 2/1979 | Calvert et al. | |
| 4,178,117 A | 12/1979 | Brugler | |
| 4,204,773 A | 5/1980 | Bates | |
| 4,248,337 A | 2/1981 | Zimmer | |
| 4,258,953 A | 3/1981 | Johnson | |
| 4,313,708 A | 2/1982 | Tiliakos | |
| 4,395,052 A | 7/1983 | Rash | |
| 4,398,653 A | 8/1983 | Daloisio | |
| 4,410,076 A * | 10/1983 | West | B65G 69/185 |
| | | | 193/32 |
| 4,423,884 A | 1/1984 | Gevers | |
| 4,544,279 A | 10/1985 | Rudolph | |
| 4,548,507 A | 10/1985 | Mathis et al. | |
| 4,583,663 A | 4/1986 | Bonerb | |
| 4,626,166 A | 12/1986 | Jolly | |
| 4,697,530 A | 10/1987 | Marcotte et al. | |
| 4,701,095 A | 10/1987 | Berryman et al. | |
| 4,806,065 A | 2/1989 | Holt et al. | |
| 4,850,702 A | 7/1989 | Arribau et al. | |
| 4,856,681 A | 8/1989 | Murray | |
| 4,900,157 A | 2/1990 | Stegemoeller et al. | |
| 4,919,540 A | 4/1990 | Stegemoeller et al. | |
| 4,956,821 A | 9/1990 | Fenelon | |
| 4,993,883 A | 2/1991 | Jones | |
| 4,997,335 A | 3/1991 | Prince | |
| 5,036,979 A | 8/1991 | Selz | |
| 5,096,096 A | 3/1992 | Calaunan | |
| 5,114,169 A | 5/1992 | Botkin et al. | |
| 5,149,192 A | 9/1992 | Hamm et al. | |
| 5,303,998 A | 4/1994 | Whitlatch et al. | |
| 5,339,996 A | 8/1994 | Dubbert et al. | |
| 5,343,813 A | 9/1994 | Septer | |
| 5,375,730 A | 12/1994 | Bahr et al. | |
| 5,401,129 A | 3/1995 | Eatinger | |
| 5,413,154 A | 5/1995 | Hurst, Jr. et al. | |
| 5,426,137 A | 6/1995 | Allen | |
| 5,441,321 A | 8/1995 | Karpisek | |
| 5,443,350 A | 8/1995 | Wilson | |
| 5,445,289 A | 8/1995 | Owen | |
| 5,470,186 A | 11/1995 | Kwok | |
| 5,516,329 A * | 5/1996 | Dunn | B08B 15/002 |
| | | | 454/64 |
| 5,590,976 A | 1/1997 | Kilheffer et al. | |
| 5,609,417 A | 3/1997 | Otte | |
| 5,722,552 A | 3/1998 | Olson | |
| 5,772,390 A | 6/1998 | Walker | |
| 5,806,441 A | 9/1998 | Chung | |
| 5,913,459 A | 6/1999 | Gill et al. | |
| 5,915,913 A | 6/1999 | Greenlaw et al. | |
| 5,927,356 A | 7/1999 | Henderson | |
| 5,944,470 A | 8/1999 | Bonerb | |
| 5,997,099 A | 12/1999 | Collins | |
| 6,059,372 A | 5/2000 | McDonald et al. | |
| 6,112,946 A | 9/2000 | Bennett et al. | |
| 6,126,307 A | 10/2000 | Black et al. | |
| 6,193,402 B1 | 2/2001 | Grimland et al. | |
| 6,247,594 B1 | 6/2001 | Garton | |
| 6,379,086 B1 | 4/2002 | Goth | |
| 6,425,627 B1 | 7/2002 | Gee | |
| 6,491,421 B2 | 12/2002 | Rondeau et al. | |
| 6,517,232 B1 | 2/2003 | Blue | |
| 6,536,939 B1 | 3/2003 | Blue | |
| 6,537,015 B2 | 3/2003 | Lim et al. | |
| 6,568,567 B2 | 5/2003 | McKenzie et al. | |
| 6,622,849 B1 | 9/2003 | Sperling | |
| 6,655,548 B2 | 12/2003 | McClure, Jr. et al. | |
| 6,876,904 B2 | 4/2005 | Oberg et al. | |
| 6,980,914 B2 | 12/2005 | Bivens et al. | |
| 7,008,163 B2 | 3/2006 | Russell | |
| 7,086,342 B2 | 8/2006 | O'Neall et al. | |
| 7,100,896 B1 | 9/2006 | Cox | |
| 7,114,905 B2 | 10/2006 | Dibdin | |
| 7,252,309 B2 | 8/2007 | Soon et al. | |
| 7,284,579 B2 | 10/2007 | Elgan | |
| 7,451,015 B2 | 11/2008 | Mazur et al. | |
| 7,475,796 B2 | 1/2009 | Garton | |
| 7,500,817 B2 | 3/2009 | Furrer et al. | |
| 7,513,280 B2 | 4/2009 | Brashears et al. | |
| 7,665,788 B2 | 2/2010 | Dibdin et al. | |
| 7,762,281 B2 | 7/2010 | Schuld | |
| 7,997,213 B1 | 8/2011 | Gauthier et al. | |
| 8,387,824 B2 | 3/2013 | Wietgrefe | |
| 8,434,990 B2 | 5/2013 | Claussen | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |
| 8,545,148 B2 | 10/2013 | Wanek-Pusset et al. | |
| 8,573,917 B2 | 11/2013 | Renyer | |
| 8,585,341 B1 | 11/2013 | Oren | |
| 8,607,289 B2 | 12/2013 | Brown et al. | |
| 8,616,370 B2 | 12/2013 | Allegretti et al. | |

(56) References Cited

U.S. PATENT DOCUMENTS

| | | |
|---|---|---|
| 8,622,251 B2 | 1/2014 | Oren |
| 8,662,525 B1 | 3/2014 | Dierks et al. |
| 8,668,430 B2 | 3/2014 | Oren et al. |
| D703,582 S | 4/2014 | Oren |
| 8,827,118 B2 | 9/2014 | Oren |
| 8,834,012 B2 | 9/2014 | Case et al. |
| 8,870,990 B2 | 10/2014 | Marks et al. |
| 8,887,914 B2 | 11/2014 | Allegretti et al. |
| RE45,713 E | 10/2015 | Oren et al. |
| 9,162,261 B1 | 10/2015 | Smith |
| 9,162,603 B2 | 10/2015 | Oren |
| 9,169,706 B2 | 10/2015 | Kellam, III |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,296,572 B2 | 3/2016 | Houghton et al. |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,631,471 B2 * | 4/2017 | Fordyce ............ B01F 15/00857 |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,694,995 B2 * | 7/2017 | Haraway ............ B65G 69/188 |
| 9,701,463 B2 | 7/2017 | Oren et al. |
| 9,718,609 B2 | 8/2017 | Oren et al. |
| 9,718,610 B2 * | 8/2017 | Oren ................... B65G 65/40 |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,845,210 B2 * | 12/2017 | Oren ................... B65G 15/00 |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,569,242 B2 | 2/2020 | Stegemoeller et al. |
| 10,604,338 B2 | 3/2020 | Allegretti |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 | 1/2007 | Diosse et al. |
| 2007/0201305 A1 | 8/2007 | Heilman et al. |
| 2008/0187423 A1 | 8/2008 | Mauchle |
| 2008/0277121 A1 | 11/2008 | Phillippi et al. |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0272629 A1 | 11/2009 | Mathis, Jr. et al. |
| 2009/0292572 A1 | 11/2009 | Alden et al. |
| 2009/0314791 A1 | 12/2009 | Hartley et al. |
| 2010/0196129 A1 | 8/2010 | Buckner |
| 2010/0319921 A1 | 12/2010 | Eia et al. |
| 2012/0017812 A1 | 1/2012 | Renyer et al. |
| 2012/0018093 A1 | 1/2012 | Zuniga et al. |
| 2012/0037231 A1 | 2/2012 | Janson |
| 2012/0090956 A1 | 4/2012 | Brobst |
| 2012/0181093 A1 | 7/2012 | Fehr et al. |
| 2012/0219391 A1 | 8/2012 | Teichrob et al. |
| 2012/0247335 A1 * | 10/2012 | Stutzman ............ B08B 15/002 95/272 |
| 2012/0275976 A1 | 11/2012 | Nicholson |
| 2013/0128687 A1 | 5/2013 | Adams |
| 2013/0135958 A1 | 5/2013 | O'Callaghan |
| 2013/0142601 A1 | 6/2013 | McIver et al. |
| 2013/0206415 A1 | 8/2013 | Sheesley |
| 2013/0284729 A1 | 10/2013 | Cook et al. |
| 2013/0309052 A1 | 11/2013 | Luharuka et al. |
| 2014/0023463 A1 | 1/2014 | Oren |
| 2014/0044508 A1 | 2/2014 | Luharuka et al. |
| 2014/0076569 A1 | 3/2014 | Pham et al. |
| 2014/0083554 A1 | 3/2014 | Harris |
| 2014/0093319 A1 * | 4/2014 | Harris .................. B65G 67/50 406/117 |
| 2014/0216736 A1 | 8/2014 | Leugemors et al. |
| 2014/0305769 A1 | 10/2014 | Eiden, III et al. |
| 2014/0377042 A1 | 12/2014 | McMahon |
| 2015/0003955 A1 | 1/2015 | Oren et al. |
| 2015/0016209 A1 | 1/2015 | Barton et al. |
| 2015/0079890 A1 | 3/2015 | Stutzman et al. |
| 2015/0157995 A1 | 6/2015 | Fordyce et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver et al. |
| 2017/0123437 A1 | 5/2017 | Boyd et al. |
| 2017/0129696 A1 | 5/2017 | Oren |
| 2017/0144834 A1 | 5/2017 | Oren et al. |
| 2017/0190523 A1 | 7/2017 | Oren et al. |
| 2017/0190524 A1 * | 7/2017 | Oren ................... B65G 53/24 |
| 2017/0203915 A1 | 7/2017 | Oren |
| 2017/0217353 A1 | 8/2017 | Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |

(56) References Cited

U.S. PATENT DOCUMENTS

| | | |
|---|---|---|
| 2017/0320660 A1 | 11/2017 | Sanders et al. |
| 2017/0334639 A1 | 11/2017 | Hawkins et al. |
| 2017/0349226 A1 | 12/2017 | Oren et al. |
| 2018/0002120 A1 | 1/2018 | Allegretti et al. |
| 2018/0257814 A1 | 9/2018 | Allegretti et al. |
| 2018/0369762 A1 | 12/2018 | Hunter et al. |
| 2019/0009231 A1 | 1/2019 | Warren et al. |
| 2019/0111401 A1 | 4/2019 | Lucas et al. |
| 2020/0062448 A1 | 2/2020 | Allegretti et al. |
| 2020/0062488 A1 | 2/2020 | Jacob |
| 2020/0147566 A1 | 5/2020 | Stegemoeller et al. |

FOREIGN PATENT DOCUMENTS

| | | |
|---|---|---|
| GB | 2204847 A1 | 11/1988 |
| JP | 2008239019 A | 10/2008 |
| KR | 10-2009-0065780 A | 6/2009 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 5/2014 |
| WO | 2015119799 A1 | 8/2015 |
| WO | 2015/199993 A1 | 12/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |
| WO | 2016178691 A1 | 11/2016 |
| WO | 2016178692 A1 | 11/2016 |
| WO | 2016178694 A1 | 11/2016 |
| WO | 2016178695 A1 | 11/2016 |
| WO | 2017014768 A1 | 1/2017 |
| WO | 2017014771 A1 | 1/2017 |
| WO | 2017014774 A1 | 1/2017 |
| WO | 2017027034 A1 | 2/2017 |

OTHER PUBLICATIONS

Office Action issued in related Canadian Patent Application No. 2,996,055 dated Oct. 2, 2020, 5 pages.

U.S. Pat. No. 0802254A, Oct. 17, 1905, "Can-Cooking Apparatus," John Baker et al.

* cited by examiner

DUST CONTROL SYSTEMS FOR DISCHARGE OF BULK MATERIAL

CROSS-REFERENCE TO RELATED APPLICATION

The present application is a U.S. National Stage Application of International Application No. PCT/US2016/048420 filed Aug. 24, 2016, which is incorporated herein by reference in its entirety for all purposes.

TECHNICAL FIELD

The present disclosure relates generally to transferring dry bulk materials, and more particularly, to structures that prevent dust from escaping during the discharging of bulk materials from containers.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, for example, skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (for example, silo). The storage/delivery system may then deliver the bulk material onto a conveyor or into a hopper, which meters the bulk material through a chute into a blender tub.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. The containers are eventually emptied by dumping the contents thereof onto a mechanical conveying system (for example, conveyor belt, auger, bucket lift, etc.). The conveying system then moves the bulk material in a metered fashion to a desired destination at the well site.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (for example, bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently moving bulk material into a blender inlet of a blender unit at a job site. The systems may include a portable support structure used to receive one or more portable containers of bulk material and output bulk material from the containers directly into the blender inlet. The disclosed techniques may be used to efficiently handle any desirable bulk material having a solid or liquid constituency including, but not limited to, sand, proppant, gel particulate, diverting agent, dry-gel particulate, liquid additives and others.

In currently existing on-site bulk material handling applications, dry material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container at a desired time.

In existing systems, the containers are generally supported above a mechanical conveying system (for example, moving belt, auger, bucket lift, etc.) prior to releasing the bulk material. The discharge gates on the containers are opened to release the bulk material via gravity onto the moving mechanical conveying system. The mechanical conveying system then directs the dispensed bulk material toward a desired destination, such as a hopper on a blender unit. Unfortunately, this process can release a relatively large amount of dust into the air and result in unintended material spillage. In addition, the mechanical conveying system is generally run on auxiliary power and, therefore, requires an external power source to feed the bulk material from the containers to the blender.

The material handling systems having the support structure disclosed herein are designed to address and eliminate the shortcomings associated with existing container handling systems. Particles released into the surrounding air from the discharge of bulk materials at a site or operation may not be desirable For example, with respect to sand, dust may be generated when a sand particle is impacted and damaged causing the particle to be broken into more than one piece. The dust may be generated from the sand falling from one height to another or being mechanically thrusted into another object. For example, the sand may be discharged from an outlet from a container into a chute. One or more aspects of the present disclosure control, minimize or eviscerate the release of this dust to prevent waste and any environmental impact.

Figure 1:
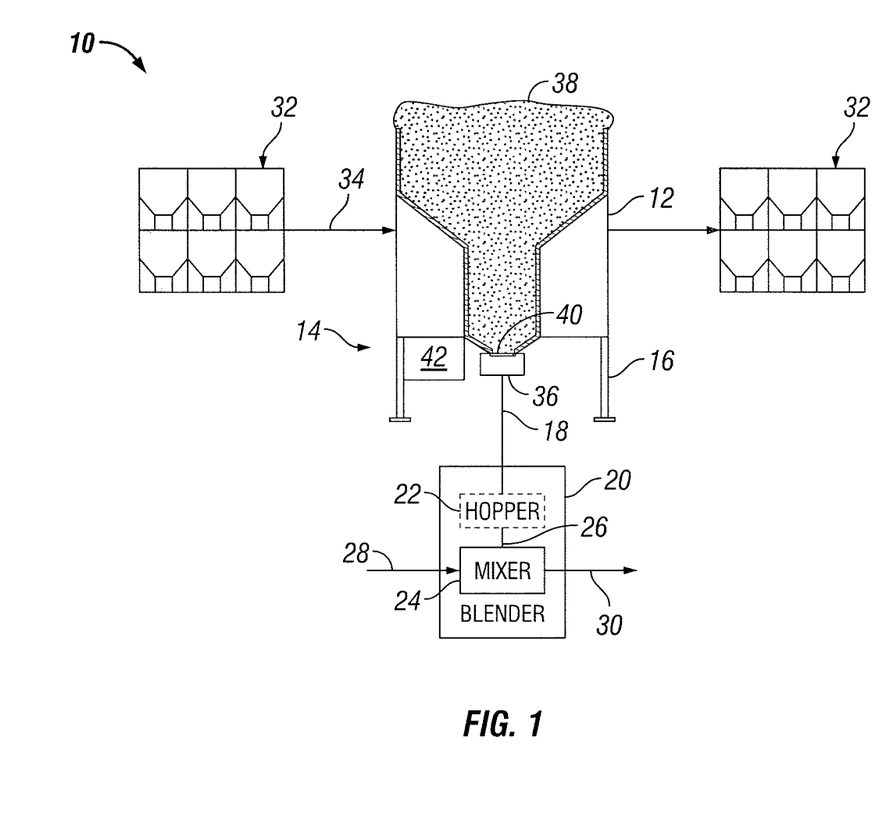
FIG. 1 is a schematic block diagram of a bulk material handling system suitable for releasing bulk material from a container disposed on a portable support structure, in accordance with one or more aspects of the present disclosure.

Turning now to the drawings, FIG. 1 is a block diagram of a bulk material handling system 10. The system 10 includes a container 12 elevated on a support structure such as portable support structure 14 and holding a quantity of bulk material 38 (for example, solid or liquid treating material). The portable support structure 14 may include a frame 16 for receiving and holding the container 12 and an outlet 18, for example, a gravity feed outlet, for directing bulk material 38 away from the container 12. The outlet 18 may be coupled to and extending from the frame 16. The outlet 18 may utilize a gravity feed to provide a controlled or metered, flow of bulk material 38 from the container 12 to a blender unit 20. In one or more embodiments, outlet 18 may comprise a chute system for guiding discharged bulk material 38 from the container 12 to blender unit 20. The outlet 18 may couple to a dust control system 36. The dust control system 36 may be part of, included with, or otherwise attached to the outlet 18. While dust control system 36 is shown at the portion of outlet 18 near the container 12, the present disclosure contemplates that the dust control system 36 may be located at any location along outlet 18.

As illustrated, the blender unit 20 may include a blender hopper 22 and a mixer 24 (for example, a mixing compartment). The blender unit 20 may also include a metering mechanism 26 for providing a controlled or metered flow or discharge of bulk material 38 from the blender hopper 22 to the mixer 24. However, in other embodiments the blender unit 20 may not include the blender hopper 22, such that the outlet 18 of the support structure 14 may provide bulk material 38 directly into the blender unit 20. In one or more embodiments, blender unit 20 may be any unit or device for collecting the discharged bulk material 38 from the blender hopper 22 suitable for a given operation. Blender hopper 22 may comprise an enclosure 68 (illustrated in FIG. 2) to control or prevent dust from escaping from the blender unit 20.

Water and other additives may be supplied to the mixer 24 (for example, the mixing compartment) through a fluid inlet 28. As those of ordinary skill in the art will appreciate, the fluid inlet 28 may comprise more than the one input flow line illustrated in FIG. 1. The bulk material 38 and a fluid, such as water, or other material may be mixed in the mixer 24 to produce (at an outlet 30) a fracking fluid, a mixture combining multiple types of proppant, proppant/dry-gel particulate mixture, sand/sand-diverting agents mixture, cement slurry, drilling mud, a mortar or concrete mixture, or any other fluid mixture for use on location, for example, at a well site or drilling operation. The outlet 30 may be coupled to a pump for conveying the treating fluid to a desired location (for example, a hydrocarbon recovery well) for a treating process. It should be noted that the disclosed system 10 may be used in other contexts as well. For example, the bulk material handling system 10 may be used in concrete mixing operations (for example, at a construction site) to dispense aggregate from the container 12 through the outlet 18 into a concrete mixing apparatus (mixer 20). In addition, the bulk material handling system 10 may be used in agriculture applications to dispense grain, feed, seed, or mixtures of the same.

It should be noted that the disclosed container 12 may be utilized to provide bulk material 38 for use in a variety of fields, area, or treating processes. For example, the disclosed systems and methods may be utilized to provide proppant materials into fracture treatments performed on a hydrocarbon recovery well. In other embodiments, the disclosed techniques may be used to provide other materials (for example, non-proppant) for diversions, conductor-frac applications, cement mixing, drilling mud mixing, and other fluid mixing applications. In other embodiments, the disclosed techniques may be used to provide materials for agriculture or land development (such as construction sites for buildings, roads, bridges, or other structures). In one or more embodiments, the container 12 may be open at the top such that bulk material 38 may be exposed. In one or more embodiments, the container 12 may have a top wall (not shown) that has an opening or gate (not shown) to allow the container 12 to be filled with bulk material 38.

As illustrated, the container 12 may be elevated above an outlet location, for example, the outlet 18, via the frame 16. The support structure 14 is designed to elevate the container 12 above the level of the blender inlet (for example, blender hopper 22, mixer 24 or both) to allow the bulk material 38 to gravity feed from the container 12 to the blender unit 20. This way, the container 12 is able to sit on the frame 16 of the support structure 14 and output bulk material 38 directly into the blender unit 20 via the outlet 18 of the support structure 14.

Although shown as supporting a single container 12, other embodiments of the frame 16 may be configured to support multiple containers 12. The exact number of containers 12 that the support structure 14 can hold may depend on a combination of factors such as, for example, the volume, width, and weight of the containers 12 to be disposed thereon and available space.

The container 12 may be completely separable and transportable from the frame 16, such that any container 12 may be selectively removed from the frame 16 and replaced with another container 12. When the bulk material 38 from the container 12 runs low or empties, a new container 12 may be placed on the frame 16 to maintain a steady flow of bulk material 38 to an outlet location. In one or more embodiments, the container 12 may be closed before being completely emptied, removed from the frame 16, and replaced by a container 12 holding a different type of bulk material 38 to be provided to the outlet location.

A portable bulk storage system 32 may be provided at the site or location for storing one or more additional containers 12 of bulk material 38 to be positioned on the frame 16 of the support structure 14. The containers 12 may be transported to the desired location on a transportation unit (for example, a truck, train, vessel, or any other transport unit). The portable bulk storage system 32 may be the transportation unit itself or may be a skid, a pallet, or some other holding area. One or more containers 12 of bulk material 38 may be transferred from the storage system 32 onto the support structure 14, as indicated by arrow 34. This transfer may be performed by lifting the container 12 via a hoisting mechanism, such as a forklift, a crane, or a specially designed container management device.

When the one or more containers 12 are positioned on the support structure 14, one or more discharge gates 40 of one or more of the containers 12 may be opened, allowing bulk material 38 to flow from the containers 12 into the outlet 18 of the support structure 14. The outlet 18 may then route the flow of bulk material 38 directly into a blender inlet (for example, into the blender hopper 22 or mixer 24) of the blender unit 20. A portion of an enclosure 68 may be disposed at the blender hopper 22 to cover the blender hopper 22 and one or more extensions of the enclosure 68 may be coupled to one or more outlets 18, for example, a bottom portion of one or more outlets 18, so as to form an enclosed pathway or tunnel from the one or more outlets 18 to the blender hopper 22. For example, as the bulk material 38 flows via one or more pathways from the one or more outlets 18 to the blender hopper 22, the one or more pathways are enclosed by the enclosure 68. Enclosure 68 may comprise a flexible material so that the enclosure 68 may be coupled to any one or more outlets 18 that may be at different distances from the blender hopper 22. For example, one or more extensions of the enclosure 68 that extend from a main portion of the enclosure 68 to the one or more outlets 18 may be accordion-shaped so as to expand and contract to accommodate the distance and to seal or enclose the space or pathways between the one or more outlets 18 and the blender hopper 22. In one or more embodiments the enclosure 68 may be retractable such that when bulk material 38 is not discharged the enclosure 68 retracts from the one or more outlets 18, the blender hopper 22 or both. The one or more extensions of the enclosure 68 may be coupled to one or more access ports of the enclosure 68 to accommodate any number of outlets 18.

After one or more of the containers 12 on the support structure 14 are emptied, the empty container(s) 12 may be removed from the support structure 14 via a hoisting mechanism. In some embodiments, the one or more empty containers 12 may be positioned on another bulk storage system 32 (for example, a transportation unit, a skid, a pallet, or some other holding area) until they can be removed from the site, refilled or both. In other embodiments, the one or more empty containers 12 may be positioned directly onto a transportation unit for transporting the empty containers 12 away from the site. It should be noted that the same transportation unit used to provide one or more filled containers 12 to the location may then be utilized to remove one or more empty containers 12 from the site.

Figure 2:
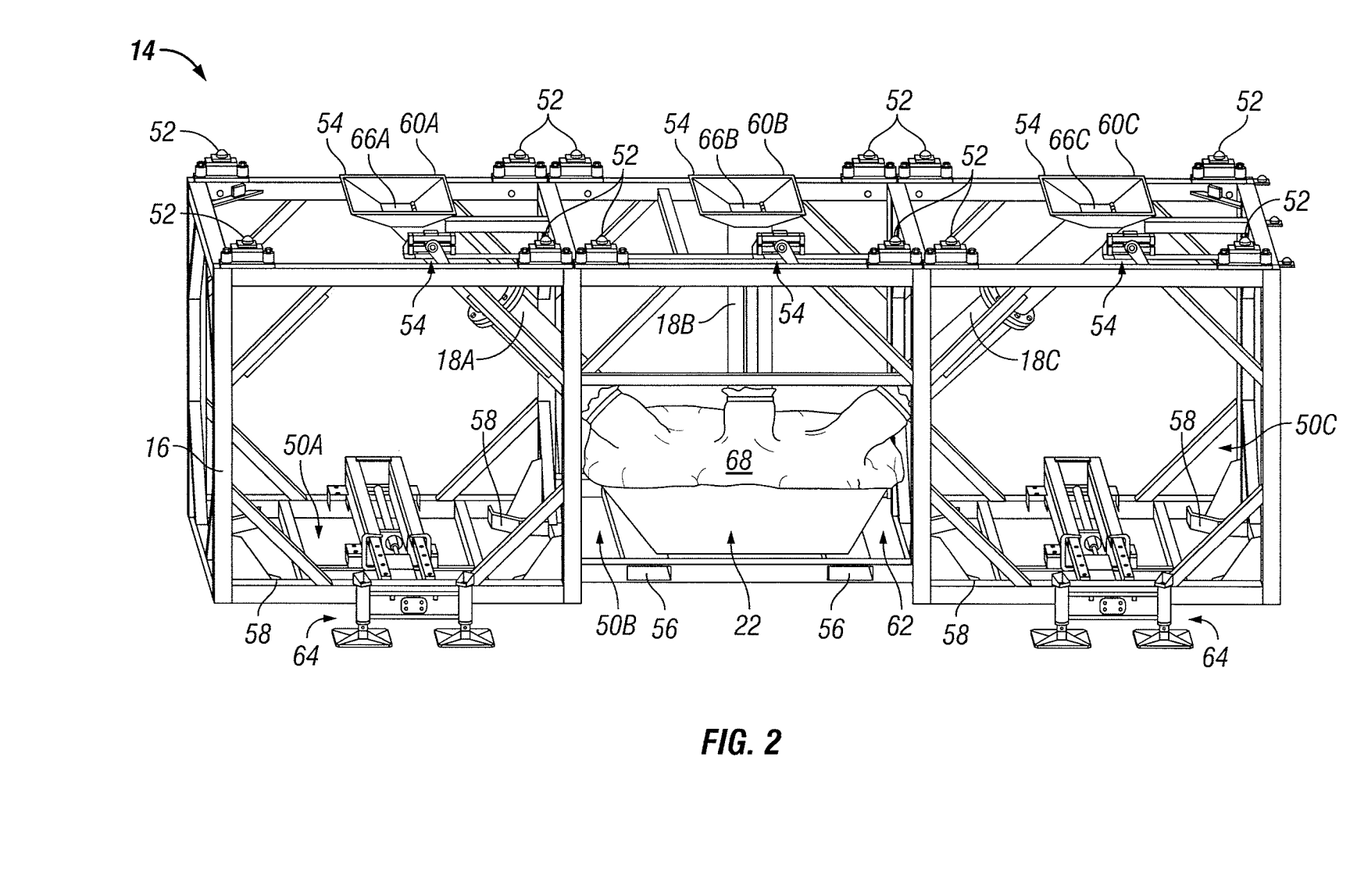
FIG. 2 is a perspective view for a dust control system, in accordance with one or more aspects of the present disclosure.

FIG. 2 is a perspective view for a dust control system, in accordance with one or more aspects of the present disclosure. FIG. 2 illustrates an embodiment of the support structure 14 that may be designed to receive multiple containers, for example, containers 12 illustrated in FIG. 1. Specifically, the support structure 14 includes a frame 16 sized to receive and support up to three portable containers 12. The frame 16 may include several beams connected together (for example, via welds, rivets or bolts) to form a continuous group of cubic or rectangular shaped supports 50 coupled end to end. For example, in the illustrated embodiment, the frame 16 generally includes one continuous, elongated rectangular body broken into three distinct cubic/rectangular supports 50A, 50B, and 50C. Each cubic/rectangular support 50 may be used to support a single container 12. The frame 16 may include additional beams that function as trusses to help support the weight of the filled containers 12 disposed on the frame 16. Other shapes, layouts, and constructions of the frame 16 may be used in one or more embodiments. In addition, other embodiments of the support structure 14 may include a frame 16 sized to receive any number (for example, 1, 2, 4, 5, 6, 7, or more) or portable containers 12.

As illustrated, the support structure 14 may be equipped with a plurality of locator pins 52 disposed on top of the frame 16 for locating and holding the containers 12 on the frame 16. The containers 12 may include complementary engagement features designed to interface with the locator pins 52, thus enabling a precise placement of the containers 12 into desired locations on the frame 16. In the illustrated embodiment, the locator pins 52 are generally disposed at the corners on the upper face of each cubic/rectangular support 50. However, other placements of the locator pins 52 along the upper surface of the support structure 16 may be utilized in other embodiments.

The support structure 14 may also include one or more actuators 54 designed to aid in actuation of a discharge gate 40 of the one or more containers 12 disposed on the frame 16. In the illustrated embodiment, the actuators 54 may be rotary actuators designed to rotate into engagement with a discharge gate 40 of a container 12 to transition the discharge gate 40 between a closed position and an open position. In other embodiments, the actuators 54 may be linear actuators designed to interface with the discharge gates 40 of the containers 12 to selectively open and close the discharge gates 40. In some embodiments, the actuators 54 may include a set of two actuators (disposed on opposite sides of the frame 16) for actuating the discharge gate 40 of a single container 12 disposed on the frame 16. In such an arrangement, one of the actuators 54 may transition the discharge gate 40 from closed to open, while the opposite actuator 54 may transition the gate from an open to closed position.

The illustrated support structure 14 may be transportable to and from a desired or predetermined location on a flatbed trailer (such as support structure 14 of FIG. 3) or some other transportation unit. Once at a location, a hoisting mechanism (for example, forklift, crane, etc.) (not shown) may be used to remove the support structure 14 from the transportation system unit and to place the support structure 14 into a desired or predetermined position. To that end, the support structure 14 may include slots 56 that a forklift can engage to lift and manipulate the portable support structure 14 about the site. In the illustrated embodiment, the slots 56 are formed in a section of the frame 16 that is slightly elevated above a lower edge of the support structure 14. This may enable relatively easy release of the forklift from the support structure 14 once the support structure 14 is positioned on the ground or predetermined location. The slots 56 may be formed through a central portion (for example, central cubic/rectangular support 50B) of the elongated support structure 14 to keep the weight of the support structure 14 evenly distributed during movement at the site or predetermined location. In other embodiments, the support structure 14 may include other types of mechanical features for interfacing with another type of hoisting mechanism. For example, the support structure 14 may include one or more lifting eyes (not shown) for interfacing with a crane (not shown) used to position the support structure 14 as needed at the site or predetermined location.

Once the forklift (or other hoisting mechanism) brings the support structure 14 to a desired location at the site, the hoisting mechanism may lower the support structure 14 onto the ground or a relatively flat loading area proximate the ground level, or other predetermined location. The frame 16 may include corner supports 58 for distributing a weight of the support structure 14 (and any containers 12 disposed thereon) along the ground surface or predetermined location. As shown, the corner supports 58 may be disposed along the lower surface of the frame 16 at various corners of the cubic/rectangular supports 50. In the illustrated embodiment, for example, the corner supports 58 may be disposed at the lower corners of the two outside cubic/rectangular supports 50A and 50C, since the lower surface of the central support 50B is slightly elevated above the ground level.

As described above, the support structure 14 may include several outlets 18 for routing bulk material 38 directly from one or more containers 12 disposed on the frame 16 into a blender inlet. The term "blender inlet" used herein may refer to any number of inlets to tubs, hoppers, mixers, and other areas where bulk material is needed. As mentioned above, the blender inlet may be associated with a blender unit 20 disposed at a job site (for example, at a well site). For example, the blender inlet may be a blender hopper (for example, blender hopper 22 of FIG. 1) used to provide bulk material 38 to a metering system that meters the bulk material into a mixer 24. In other embodiments, the blender inlet may be an inlet directly into a mixing vessel (for example, mixer 24 of FIG. 1) of a blender unit 20. In such instances, the mixing vessel may be configured such that it is sitting directly on the ground or other substantially level location, instead of in an elevated position within the blender. This may enable a container 12 to dump bulk material 38 directly into the mixer 24, without the container 12 being elevated exceedingly high or above a predetermined threshold. In still other embodiments, the blender inlet may be a mixer feeder (for example, conveyor, sand screw, or the metering mechanism 26 of FIG. 1). Other embodiments may utilize other types of blender inlets for receiving the bulk material 38 from a container 12 disposed on the support structure 14.

In the illustrated embodiment, the blender unit 20 and support structure 14 may be designed such that the support structure 14 routes bulk material 38 directly from a container 12 into the blender hopper 22. The "blender inlet" may correspond to the blender hopper 22. In FIG. 2, the blender hopper 22 is shown schematically without showing the rest of the blender unit 20 (for example, mixing compartment, sand screws for transporting bulk material from the blender hopper 22 to the mixer 24, or any other suitable unit). Again, it should be noted that other embodiments of the blender unit 20 may feature other types of blender inlets into which the outlets 18 are designed to route bulk material 38 from one or more containers 12.

The outlets 18A, 18B, and 18C may be used to deliver a flow of bulk material 38 to the blender hopper 22 (or other blender inlet) from each of three respective containers 12 disposed on the frame 16. In some embodiments, the support structure 14 may also include individual hoppers 60A, 60B, and 60C at the top of the frame 16 for funneling bulk material 38 from the discharge gate 40 of the corresponding containers 12 into the outlets 18A, 18B, and 18C, respectively.

In one or more embodiments, a dust control system 36 may be utilized to control the escape of dust during discharge of bulk material 38. In one or more embodiments, a dust control system 36 may comprise a dust control dampers 66A, 66B and 66C. Dust control dampers 66 may be coupled, attached or otherwise affixed to or engage corresponding hoppers 60A, 60B, and 60C or corresponding outlets 18A, 18B and 18C. In one or more embodiments, dust control damper 66 may be coupled directly to outlet 18 when hopper 60 is not present.

The outlets 18A, 18B, and 18C may be chutes positioned so that the upper end of each chute is disposed beneath a discharge gate 40 of a corresponding container 12 (or one of the hoppers 60) on the frame 16. In one or more embodiments, the discharge gate 40 is configured to engage the dust control damper 66 to transition the dust control damper 66 to an open position when the discharge gate 40 is in at least an open or partially open position to form a seal to prevent the escape of dust during discharge of bulk material 38. In one or more embodiments, the discharge gate 40 does not engage the dust control damper 66 when the discharge gate 40 is in an open position. In one or more embodiments, the discharge gate 40 is a horizontally or vertically slidable gate. In one or more embodiments, the discharge gate 40 comprises one or more slots to provide metering of the discharge of bulk material 38.

In one or more embodiments, the outlets 18 may be positioned such that the lower end of each of the gravity feed outlets 18 is disposed fully within the blender hopper 22. This allows the outlets 18 to provide bulk material 38 from all of the containers 12 positioned on the frame 16 into the same blender inlet (for example, blender hopper 22) at or near the same time. The outlets 18 may provide a gravity feed where an angle of repose of the bulk material 38 exiting the outlets 18 is able to choke the flow of bulk material 38 through the outlets 18. As bulk material 38 is metered from the blender hopper 22 into another portion of the blender unit 20 (for example, mixer 24), additional bulk material 38 flows via gravity into the blender hopper 22 directly from the one or more gravity feed outlets 18. In embodiments where the outlets 18 are positioned to route bulk material 38 directly from the containers 12 into an inlet of the mixer 24 of the blender unit 20, the gravity feed outlets 18, the blender inlet, or both may feature a metering gate/valve that regulates the amount of bulk material 38 provided to the mixer 24 (for example, instead of separate sand screws).

The disclosed outlets 18 provide a more controlled output of bulk material 38 to the blender inlet (for example, blender hopper 22) than would be available through the use of mechanical conveying systems to drop bulk material 38 into the blender hopper 22. In addition, the choke feed of bulk material 38 through the outlets 18 and into the blender inlet may reduce an amount of dust generated at a well site, as compared to existing pneumatic or mechanical conveying systems. Further, the outlets 18 are able to route the bulk material 38 directly into the blender inlet from the containers 12 without the use of pneumatic or mechanical conveyance equipment operating on auxiliary power making moving the bulk material more efficient than would be possible using a separate pneumatic or mechanical conveyor between the containers and the blender.

It may be desirable for the outlets 18 to be angled by a certain amount so that the lower ends of the outlets 18 interface directly with the blender hopper 22. In some embodiments, the angle of inclination of each gravity feed outlet 18 from a horizontal plane may be between approximately 25 and 55 degrees, between approximately 30 and 50 degrees, between approximately 35 and 45 degrees, or equal to approximately 40 degrees. As shown, it may be desirable to angle the outlets 18 such that outlets 18 direct the bulk material 38 toward a central collection point proximate a center portion (for example, support 50B) of the support structure 14.

Although illustrated in FIG. 2, the blender hopper 22 (or other blender inlet) may be entirely separate from the support structure 14. As described above, the blender inlet may be part of a separate blender unit (for example, blender unit 20 of FIG. 1). It may be desirable to position the support structure 14 and the blender unit 20 relative to one another to bring the outlets 18 into the desired discharge positions within the blender inlet (for example, hopper 22). To that end, the support structure 14 may include an opening 62 disposed therein for receiving or being positioned over the blender inlet. In some embodiments, a forklift or some other transportation unit may lift the portable support structure 14 and lower the support structure 14 directly over the blender unit 20 so that the opening 62 is positioned over the blender inlet and the outlets 18 extend into the blender inlet. In addition to or in lieu of this placement of the support structure 14, the blender unit 20 may be backed up relative to support structure 14 (which is already positioned on the ground) until the blender inlet (for example, blender hopper 22) is received into the opening 62 and aligned with the outlets 18.

In some instances, the support structure 14 may be equipped with a set of outriggers 64 to increase the stability of the portable support structure 14. The outriggers 64 may help to keep the support structure 14 stable in the event of high winds or the support structure 14 being impacted by a container, forklift, blender, or other pieces of equipment at the job site. In addition, the outriggers 64 on the support structure 14 may be used for interfacing with the blender unit 20 to bring the blender inlet into a desired position or alignment within the opening 62 of the support structure 14.

Figure 3:
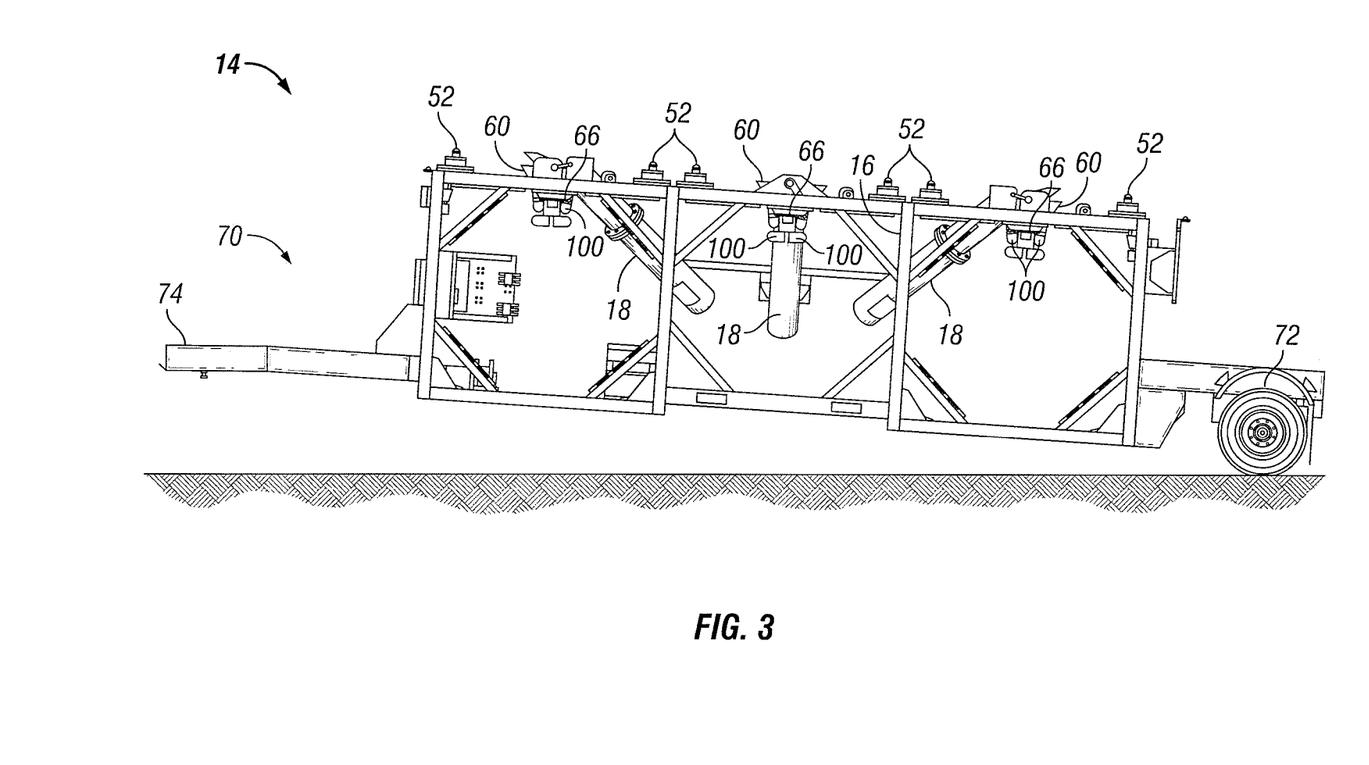
FIG. 3 is a side view for a dust control system integrated with a trailer unit, in accordance with an embodiment of the present disclosure.

To further improve the mobility, transportability, and rig-up speed at the job site, the portable support structure 14 may be integrated into a specialized support structure trailer unit 70, as shown in FIG. 3. As illustrated, the support structure trailer unit 70 may include similar components as the above described support structure 14 (for example, frame 16 and one or more outlets 18). In addition, the support structure trailer unit 70 includes wheels 72 for enabling transportation of the support structure trailer unit 70 to and from a desired or predetermined location (for example, a well site). In the illustrated embodiment, a front end 74 of the support structure trailer unit 70 may be designed to lift up and hook onto a trailer hitch of a transportation vehicle. Once the support structure trailer unit 70 is transported to the site, the front end 74 may be lifted off the transportation vehicle and the support structure trailer unit 70 may be lowered directly to the ground, without the use of a hoisting mechanism (for example, forklift, crane, etc.). The support structure 14 may be integrated into other types of mobile trailer units as well.

Having the support structure 14 integrated into a separate mobile unit such as support structure trailer unit 70 may improve the reliability of the various components that make up the support structure 14 and increase the life of the support structure 14. This is because every time the support structure 14 is lifted or moved via a hoisting mechanism, for example, the frame 16, electronics, controls, outlets 18 or any combination thereof can be negatively impacted. Shock from movement of the relatively large support structure about a site can lead to undesirable operations of the support structure components. With the support structure 14 integrated into the trailer unit 70, the shock due to loading/unloading the portable support structure 14 itself is minimized.

In some embodiments, the support structure trailer unit 70 may also include an air suspension system or other components to reduce shock on the support structure 14 during transportation of the trailer unit 70 (for example, traveling along a road). The suspension system may help to further isolate the electronics and controls of the support structure from shock loading during transportation of the support structure trailer unit 70 along the road.

Figure 4A:
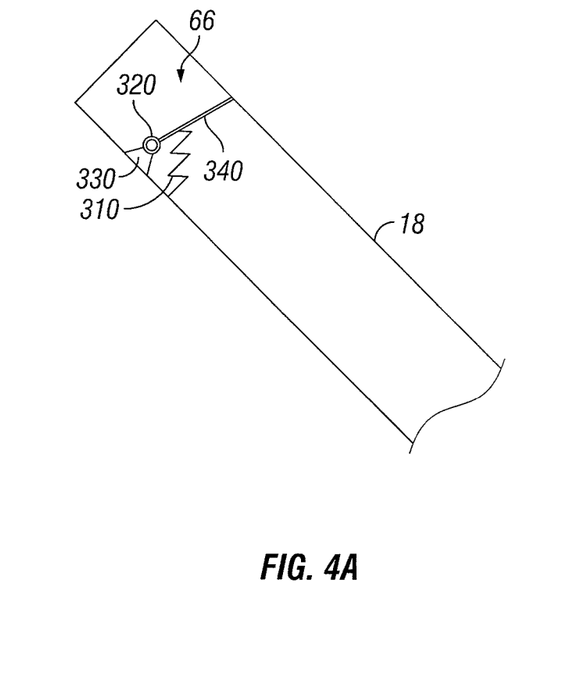
FIG. 4A is a perspective view of a dust control damper for a dust control system in accordance with one or more aspects of the present disclosure.
Figure 4B:
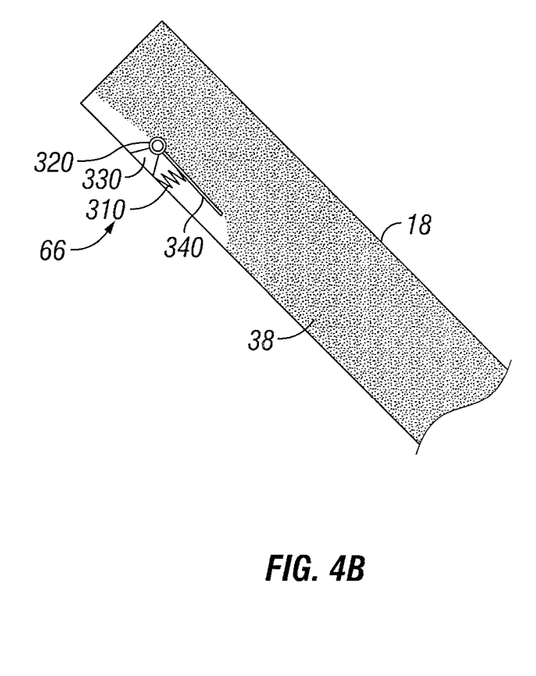
FIG. 4B is a perspective view of a dust control damper for a dust control system in accordance with one or more aspects of the present disclosure.

FIG. 4A and FIG. 4B are perspective views of a dust control chute of a dust control system in accordance with one or more aspects of the present disclosure. Each time bulk material 38 is discharged from a container 12, small particles or dust may be released into the surrounding air and area. When the discharge gate 40 of a container 12 is first opened, bulk material 38 may rapidly fill the hopper 60, the outlet 18, the blender hopper 22, the blending unit 20 or any combination thereof. The displaced air within any of these devices may mix with dust from the bulk material 38 and be released externally, for example, into the surround air or environment. This dust may be hazardous to operators and to the environment, may be expensive to reclaim, to dispose of, or both, cause nearby equipment to malfunction or require frequent repair or may provide an unsafe operation environment. Disposing a dust control damper 66 at each corresponding outlet 18 or hopper 60 of a support structure 14 (whether or not a container is associated with the corresponding hopper 60 or outlet 18) prevents this dust from escaping during discharge of bulk material 38.

In one or more embodiments dust control damper 66 may comprise one or more devices or components including, but not limited to, a damper 340, a pivot device 320 and a bracket 330. In one or more embodiments, dust control damper 66 may comprise any one or more additional or other components for coupling the dust control damper 66 to the outlet 18 or the hopper 60 (not shown). The one or more devices or components of the dust control damper 66 are configured to maintain a seal against the outlet 18 or the hopper 60 when bulk material 38 is not being discharged through the outlet 18 or the hopper 60. In one or more embodiments, the dust control damper 66 is configured to transition from a closed position to an open position based, at least in part, on a predetermined amount of force where the predetermined amount force may be due to a predetermined weight of bulk material 38. For example, the dust control damper 66 may transition to an open position from a closed position when the discharge gate 40 is in a position to allow a certain amount of pounds of bulk material 38 to be discharged to the outlet 18.

In one or more embodiments, the damper 340 may comprise sheet metal, composite material or any other material that may seal the damper 340 against a top portion the outlet 18 (or the hopper 60). The damper 340 may operate similar to a gate in that the damper 340 may have a closed position and an open position. A closed position of the damper 340 prevents any dust from escaping the outlet 18 or the hopper 60. For example, when bulk material 38 is being discharged through outlet 18A, dust may be generated by the force of displaced air in outlet 18B and outlet 18C. Disposing a dust control damper 66 about each outlet or any one or more outlets (for example, a top portion of outlets 18A, 18B and 18C or any combination thereof) prevents the displaced air from forcing dust into the surround air. For example, a when bulk material 38 is ready to be discharged, the dust control damper 66A is placed in an open position and as the bulk material 38 is discharged through a top portion of outlet 18A, the damper 340A is forced into an open position by the weight of the bulk material 38 while the dampers 340 of each respective dust control damper 66B and 66C are maintained in a closed position.

A spring 310 may couple to the damper 340 such that the spring 310 applies a force against the damper 340 to automatically maintain the damper 340 in a closed position (as illustrated in FIG. 4A) as a default or resting state, for example, when bulk material 38 is not being discharged. The spring 310 permits the damper 340 to be positioned in an open position (as illustrated in FIG. 4B) when bulk material 38 is being discharged. The spring 310 may comprise any material that permits the spring 310 to expand and contract to create a force against the damper 340 such that the damper 340 automatically returns to a closed position from an open position once the discharge of bulk material 38 is discontinued or stopped creating a strong positive seal. In one or more embodiments, a torsion spring, gas spring or any other suitable device. In one or more embodiments, an actuator may be configured to open and close the damper 340. In one or more embodiments, one or more sensors may be coupled to the dust control damper 66. Electronics or a computing device may be coupled to sensors. The damper 340 may be transitioned from a closed position to an open position based, at least in part, on one or more measurements or readings from the one or more sensors. For example, the one or more sensors may comprise a temperature sensor to detect an increase or decrease in temperature (for example, due to the discharge of the bulk material 38), a motion detector, an acoustic sensor, a sensor that provides a video or audio feed, any other type of suitable sensor, or any combination thereof. The damper 340 may be transitioned based, at least in part, on a measurement or reading from a sensor that is above or below a predetermined threshold. In one or more embodiments, the damper 340 may be operated manually.

A pivot 320 may couple to the damper 340 to allow or permit the damper 340 to swing or move from an open position to a closed position. The pivot 320 may comprise a hinge, a rack and pinion, a screw and nut, or any other type of device that would permit damper 340 to move from an open position to a closed position. The pivot 320 may be coupled to a bracket 330. The bracket 330 couples the pivot 320 and the damper 340 to the outlet 18 or the hopper 60. In one or more embodiments, the bracket 330 may couple to the hopper 60 and the outlet 18 and may be temporarily or permanently coupled to one or more of the hopper 60 or the outlet 18.

Figure 5A:
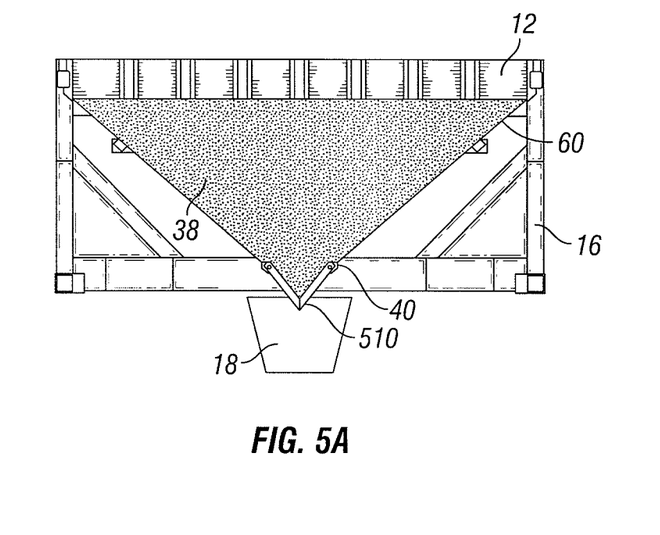
FIG. 5A is a perspective view of dust control self-sealing shroud for a dust control system in accordance with one or more aspects of the present disclosure.
Figure 5B:
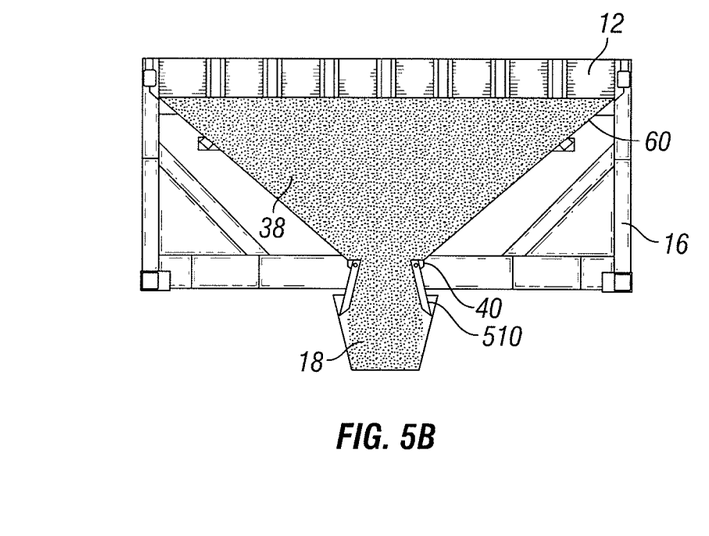
FIG. 5B is a perspective view of dust control self-sealing shroud for a dust control system in accordance with one or more aspects of the present disclosure.

FIG. 5A and FIG. B are perspective views of dust control self-sealing shroud for a dust control system in accordance with one or more aspects of the present disclosure. A dust control system 36 may comprise a dust control self-sealing shroud 510. The dust control self-sealing shroud 510 may be disposed at the discharge 40 of the container 12. The dust control self-sealing shroud 510 may comprise a flexibly collapsible material shaped in a flanged, strip, Iris, or pleated skirt design. For example, the dust control self-sealing shroud 510 may comprise a plurality of strips of material that partially overlay one another and that are bound at one end together about a ring or opening of the container 12 at the discharge gate 40 such that a cone shaped is formed when not expanded. The dust control self-sealing shroud 510 may comprise rubber, composite material, canvas or any other flexible material that may be formed to collapse and expand according to the aspects of the present disclosure.

When the discharge gate 40 is in an open position and bulk material 38 is discharged from the container 12, the dust control self-sealing shroud 510 is forced by the flowing bulk material 38 to splay, expand or conform to an interior shape of the outlet 18 (as illustrated in FIG. 5B) creating a seal that prevents dust from the discharge of bulk material 38 from escaping into the surrounding air. The dust control self-sealing shroud 510 also blocks wind or turbulent air from passing through discharging bulk material 38 or into the outlet 18 which prevents the unintentional or errant release of dust. As the dust control self-sealing shroud 510 is maintained in with the outlet 18 when expanded, the dust control self-sealing shroud 510 is protected from most rips and tears as no edge surfaces are exposed to the surrounding environment. When the discharge gate 40 is in a closed position, the dust control self-sealing shroud 510 collapses or returns to contracted position (as illustrated in FIG. 5A).

Figure 6:
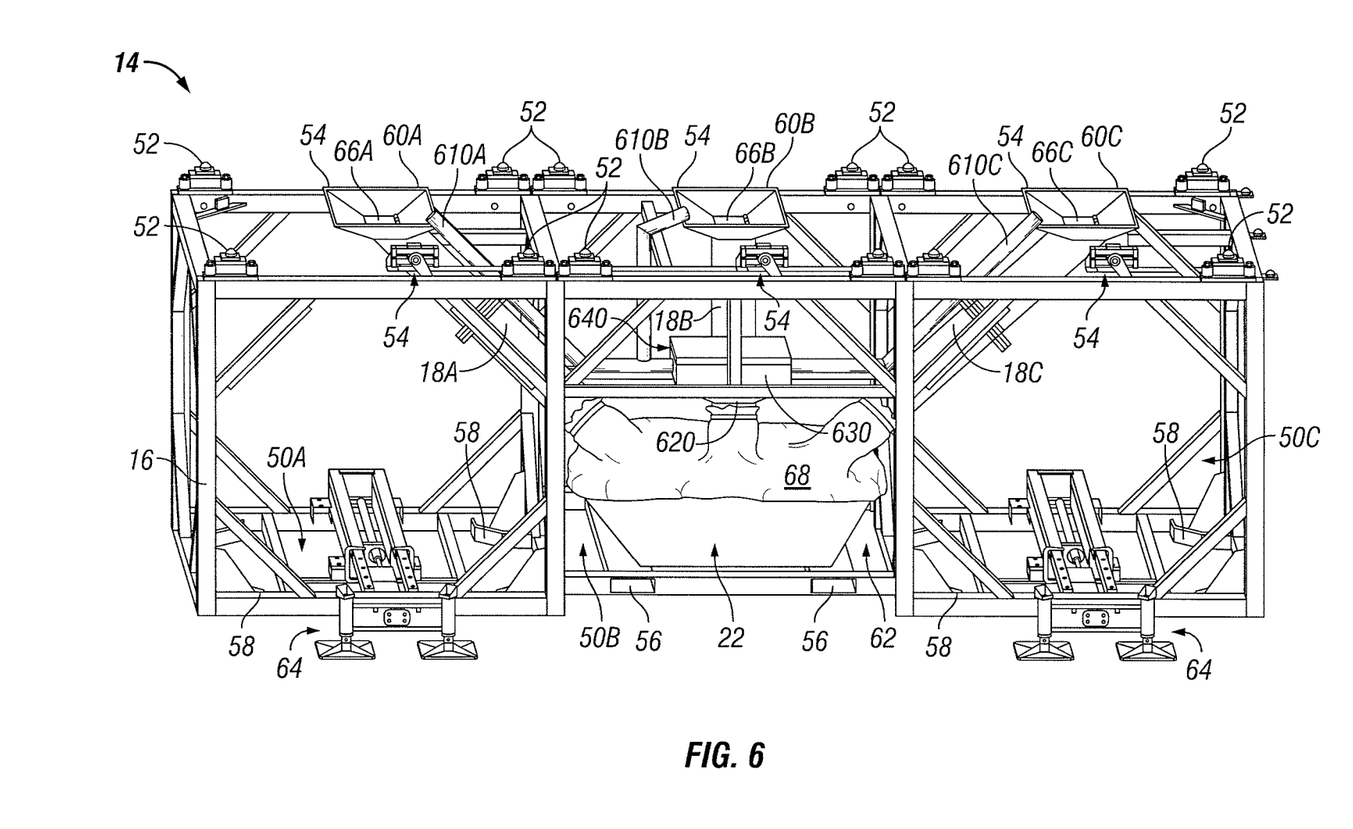
FIG. 6 is a perspective view of a vacuum for a dust control system in accordance with one or more aspects of the present disclosure.

FIG. 6 is a perspective view of a vacuum system for a dust control system in accordance with one or more aspects of the present disclosure. In one or more embodiments, a vacuum system 640 may comprise a vacuum unit 630, a vacuum hopper 620 and one or more ducts 610. Vacuum unit 630 may comprise the necessary electronics and devices associated with a vacuum to create a vacuum suction for the reclaiming of dust during discharge of bulk material 38. In one or more embodiments, any one or more of the necessary electronics and devices may be disposed within the vacuum unit 630 or external to the vacuum unit 630. In one or more embodiments, vacuum unit 630 may be disposed above a location where a blender hopper 22, a blender unit 20, or any other receptacle or device may be positioned inside frame 16 as illustrated in FIG. 6. In one or more embodiments, a vacuum unit 630 may be disposed outside of the frame 16, inside frame 16, below a blender hopper 22, beside a blender hopper 22 or at any other location associated with support structure 14. For example, in one embodiment, the vacuum unit 630 may disposed at a location on a ground level at or near the support structure 14. The vacuum unit 630 may be positioned based, at least in part, on one or more characteristics of the vacuum unit 630. The one or more characteristics of the vacuum unit 630 may include, but are not limited to, size, shape, distance to power supply, pressure, and air flow rating.

The vacuum unit 630 may couple to one or more ducts 610. The ducts 610 may comprise a length sufficient to flow from the vacuum unit 630 at or near the location where a discharge gate 40 of container 12 is aligned with an outlet 18 or hopper 60. Placing the ducts 610 as close as possible to the discharge gate 40 permits the vacuum unit 630 to reclaim as much dust as possible during discharge of the bulk material 38. In one or more embodiments, ducts 610A, 610B and 610C are positioned or disposed proximate to the corresponding outlets 18A, 18B and 18C or hoppers 60A, 60B and 60C. A vacuum hopper 620 may be coupled to the vacuum unit 630 to capture the reclaimed dust. While vacuum hopper 620 is shown directly coupled to vacuum unit 630, in one or more embodiments vacuum hopper 620 may be coupled to the vacuum unit 630 via piping or conduit (not shown) and positioned at any suitable location within the frame 16, outside the frame 16 or at any other location of the site. Reclaimed dust may be fed to the vacuum hopper 620 in a gravity feed manner (for example, as illustrated in FIG. 6), by an auger, or any other suitable mechanism or device. Once the vacuum system 640, for example, the vacuum unit 630, ducts 610 and vacuum hopper 620, are mounted, no further installation is required for the duration of an operation. In one or more embodiments, the vacuum system 640 may be disposed on a trailer 74 as illustrated in FIG. 3. Pre-positioning and integrating the vacuum system 640 with the frame 16 may reduce the rig-up time, reduce labor time, and provide efficient operation at a site.

The present disclosure contemplates that any one or more of the dust control systems 36 may be used together or separately. For example, the dust control damper 66, dust control self-sealing shroud 510 and vacuum unit 630 may be disposed at a frame 16 and may operate together to prevent dust from escaping from the support structure 14 during discharge of bulk material 38.

In one or more embodiments, a dust control system comprises a support structure, wherein the support structure comprises a frame, a plurality of outlets coupled to the frame, and a dust control damper system coupled to an outlet, wherein the dust control system sealingly mates to the outlet when the dust control damper is in a closed position to prevent dust from escaping from the outlet, wherein the dust control damper is configured to be placed in an open position when a bulk material is discharged onto the dust control damper, and wherein the dust control damper is configured to automatically return to a closed position from an open position. In one or more embodiments, the dust control damper system comprises a spring and a damper and the spring is coupled to the damper and the spring exerts a force on the damper to automatically return the damper to the closed position from the open position. In one or more embodiments the dust control damper system comprises a pivot and a bracket. In one or more embodiments, the hinge is coupled to the damper, the pivot allows the damper to move between the open position and the closed position, and the bracket is coupled between the hinge and the outlet. In one or more embodiments, the dust control system further comprises a hopper coupled to the outlet, wherein the hopper receives the bulk material via the outlet and an enclosure coupled to the hopper. In one or more embodiments, the dust control system further comprises a vacuum system, wherein the vacuum system reclaims dust associated with the dust control system. In one or more embodiments, wherein the dust control damper is calibrated to transition to an open position based, at least in part, on an amount of predetermined force due to a weight of the bulk material.

In one or more embodiments, a dust control system comprises a support structure, wherein the support structure comprises a frame, a plurality of outlets coupled to the frame, a container disposed about at least one of the plurality of outlets, and a dust control self-sealing shroud coupled to a discharge gate of a container, wherein the dust control self-sealing shroud comprises a flexibly collapsible material to mate to the outlet when the dust control self-sealing shroud is in an expanded position. In one or more embodiments, the dust control self-sealing shroud comprises a pleated material. In one or more embodiments, the dust control self-sealing shroud comprises two or more strips of material that overlap. In one or more embodiments, the dust control system further comprises a vacuum system disposed at a bottom portion of the container, wherein the vacuum system reclaims dust from a discharge of the bulk material.

In one or more embodiments, a dust control method comprises aligning a plurality of dust control dampers with a plurality of outlets of a frame of a support structure, wherein the plurality of dust control dampers comprises at least a first dust control damper and a second dust control damper, wherein the plurality of dust control dampers are configured to automatically maintain a closed position, receiving a first container of bulk material onto the frame of the support structure, wherein the container is aligned above the first dust control damper and a first outlet of the plurality of outlets of the frame, aligning a first discharge gate of the first container with a first dust control damper and the first outlet, discharging the bulk material of the first container via the first discharge gate, transitioning the first dust control damper from a closed position to an open position, maintaining the second dust control damper aligned with a second outlet of the plurality of outlets in a closed position during the discharge of the bulk material, and controlling dust emissions associated with the discharge of the bulk material by forming a seal between the second dust control damper and the second outlet. In one or more embodiments, the dust control damper system comprises a spring and a damper, and the spring exerts a force on the damper to automatically transition the damper between an open position and a closed position. In one or more embodiments, the dust control method further comprises wherein the dust control damper system comprises a pivot and a bracket to allow the damper to transition between the open position and the closed position. In one or more embodiments, the dust control method further comprises receiving the bulk material via the outlet at a hopper, wherein the hopper is coupled to the outlet, and wherein controlling dust emissions further comprises sealing the hopper with an enclosure. In one or more embodiments, the method further comprises reclaiming dust associated with the dust control system via a vacuum system. In one or more embodiments, the method further comprises expanding a dust control self-sealing shroud, wherein the dust control self-sealing shroud is coupled to a discharge gate of a container, and wherein the dust control self-sealing shroud comprises a flexibly collapsible material to mate to the outlet when the dust control self-sealing shroud is in an expanded position. In one or more embodiments, the dust control self-sealing shroud comprises a pleated material. In one or more embodiments, the dust control self-sealing shroud comprises two or more strips of material that overlap. In one or more embodiments, the dust control method further comprises reclaiming dust from a discharge of the bulk material via a vacuum system disposed at a bottom portion of the container. In one or more embodiments, the dust control method further comprises calibrating the dust control damper to transition to an open position based, at least in part, on an amount of predetermined force due to a weight of the bulk material.

Although the present disclosure and its advantages have been described in detail, it should be understood that various changes, substitutions and alterations can be made herein without departing from the spirit and scope of the disclosure as defined by the following claims.

What is claimed is:

1. A dust control system, comprising:
   a support structure, wherein the support structure comprises a frame, wherein a container is receivable by the frame;
   a plurality of outlets coupled to the frame;

a dust control damper system coupled to at least one outlet of the plurality of outlets such that the dust control damper system is configured to allow a material discharged from a container disposed above the dust control damper system to flow through the at least one outlet, wherein the dust control damper system comprises a damper that sealingly mates to the at least one outlet when the damper is in a closed position to prevent dust from escaping from the at least one outlet, wherein the damper is configured to be placed in an open position when a bulk material is discharged from the container onto the dust control damper system, and wherein the damper is configured to automatically return to a closed position from an open position; and
a vacuum system, wherein the vacuum system reclaims dust associated with the dust control damper system, wherein the vacuum system comprises one or more ducts, wherein each of the one or more duscts is positioned near each of the plurality of outlets.

2. The dust control system of claim 1, wherein:
the dust control damper system comprises a spring;
the spring is coupled to the damper; and
the spring exerts a force on the damper to automatically return the damper to the closed position from the open position.

3. The dust control system of claim 2, wherein:
the dust control damper system comprises a pivot and a bracket;
the hinge is coupled to the damper;
the pivot allows the damper to move between the open position and the closed position; and
the bracket is coupled between the hinge and the outlet.

4. The dust control system of claim 1, further comprising:
a hopper coupled to the outlet, wherein the hopper receives the bulk material via the outlet; and
an enclosure coupled to the hopper.

5. The dust control system of claim 1, wherein the vacuum system further comprises a vacuum unit and a vacuum hopper, wherein the vacuum unit is coupled to the one or more ducts, wherein the vacuum hopper is coupled to the vacuum unit.

6. The dust control system of claim 1, wherein the dust control damper is calibrated to transition to an open position based, at least in part, on an amount of predetermined force due to a weight of the bulk material.

7. The dust control system of claim 1, wherein the vacuum hopper is configured to receive reclaimed dust from the vacuum unit through a gravity feed manner.

8. A dust control system, comprising:
a support structure, wherein the support structure comprises a frame;
a plurality of outlets coupled to the frame;
a container disposed about at least one of the plurality of outlets, wherein the frame receives the container;
a discharge gate of the container, wherein the discharge gate is transitionable from a closed position to an open position to allow a material held in the container to flow to the at least one of the plurality of outlets and away from the container; and
a dust control self-sealing shroud coupled to the discharge gate of the container, wherein the dust control self-sealing shroud comprises a flexibly collapsible material to mate to the at least one of the plurality of outlets when the dust control self-sealing shroud is in an expanded position such that the dust control self-sealing shroud conforms to the shape of the at least one of the plurality of outlets.

9. The dust control system of claim 8, wherein the dust control self-sealing shroud comprises a pleated material.

10. The dust control system of claim 8, wherein the dust control self-sealing shroud comprises two or more strips of material that overlap.

11. The dust control system of claim 8, further comprising a vacuum system disposed at a bottom portion of the container, wherein the vacuum system reclaims dust from a discharge of the material from the container.

12. A dust control method, comprising:
aligning a plurality of dust control dampers with a plurality of outlets of a frame of a support structure, wherein the plurality of dust control dampers comprises at least a first dust control damper and a second dust control damper, wherein the plurality of dust control dampers are configured to automatically maintain a closed position;
receiving a first container of bulk material onto the frame of the support structure, wherein the first container is aligned above the first dust control damper and a first outlet of the plurality of outlets of the frame;
aligning a first discharge gate of the first container with a first dust control damper and the first outlet;
discharging the bulk material of the first container via the first discharge gate;
expanding a dust control self-sealing shroud, wherein the dust control self-sealing shroud is coupled to a discharge gate of the first container, and wherein the dust control self-sealing shroud comprises a flexibly collapsible material to mate to the first outlet when the dust control self-sealing shroud is in an expanded position;
transitioning the first dust control damper from a closed position to an open position;
maintaining the second dust control damper aligned with a second outlet of the plurality of outlets in a closed position during the discharge of the bulk material; and
controlling dust emissions associated with the discharge of the bulk material by forming a seal between the second dust control damper and the second outlet.

13. The dust control method of claim 12, wherein:
the dust control damper comprises a spring and a damper; and
the spring exerts a force on the damper to automatically transition the damper between an open position and a closed position.

14. The dust control method of claim 13, wherein at least one of the dust control dampers of the plurality of dust control dampers comprises a pivot and a bracket to allow the damper to transition between the open position and closed position.

15. The dust control method of claim 12, further comprising:
receiving the bulk material via at least one outlet of the plurality of outlets at a hopper, wherein the hopper is coupled to the outlet; and
wherein controlling dust emissions further comprises sealing the hopper with an enclosure.

16. The dust control method of claim 12, further comprising:
reclaiming dust associated with the plurality of dust control dampers via a vacuum system.

17. The dust control method of claim 12, wherein the dust control self-sealing shroud comprises a pleated material.

18. The dust control method of claim 12, wherein the dust control self-sealing shroud comprises two or more strips of material that overlap.

19. The dust control method of claim 16, further comprising:
    reclaiming dust from a discharge of the bulk material from the first container via a vacuum system disposed at a bottom portion of the first container.

20. The dust control method of claim 12, further comprising:
    calibrating the dust control damper to transition to an open position based, at least in part, on an amount of predetermined force due to a weight of the bulk material.

* * * * *